United States Patent [19]  
McMurray, deceased et al.

[11] 3,987,570  
[45] Oct. 26, 1976

[54] EAR TAG
[75] Inventors: Herman J. McMurray, deceased, late of Newton, Iowa; by William C. Eastland, executor, Des Moines, Iowa
[73] Assignee: Dorothy A. Eastland, Des Moines, Iowa
[22] Filed: June 19, 1975
[21] Appl. No.: 588,311

Related U.S. Application Data
[63] Continuation-in-part of Ser. No. 461,093, April 15, 1974, abandoned.

[52] U.S. Cl. .................................. 40/301; 128/330
[51] Int. Cl.² ......................................... G09F 3/00
[58] Field of Search ............. 40/301, 300; 128/329, 128/330, 2 B; 24/221 L, 247, 201 A

[56] References Cited  
UNITED STATES PATENTS
| 881,062 | 3/1908 | Dobyns | 128/330 |
| 3,605,310 | 9/1971 | Brown | 40/301 |
| 3,765,113 | 10/1973 | Magee | 40/300 |
| 3,867,777 | 2/1975 | Potter | 40/301 |

Primary Examiner—Louis G. Mancene  
Assistant Examiner—John H. Wolff  
Attorney, Agent, or Firm—Rudolph L. Lowell

[57] ABSTRACT

The invention comprises the combination of an animal ear tag and an applicator for inserting the tag into the ear. The tag has a neck portion at one side that terminates in a lateral extension of a T-shape. The applicator includes a flat, elongated knife blade, extendible from and retractible within a cylindrical housing therefor. Located rearwardly of an arrow shape cutting edge on the blade are finger means for releasably holding the lateral extension against a side of the knife blade with the cross arm of the extension located forwardly. On insertion of the blade through the ear, the cross arm of the lateral extension is concurrently moved through the resultant cut so that on withdrawal of the knife the cross arm of the lateral extension is along the side of the ear remote from the tag. A locking disc is then releasably secured to such cross arm to lock the tag against accidental removal from the ear.

5 Claims, 10 Drawing Figures

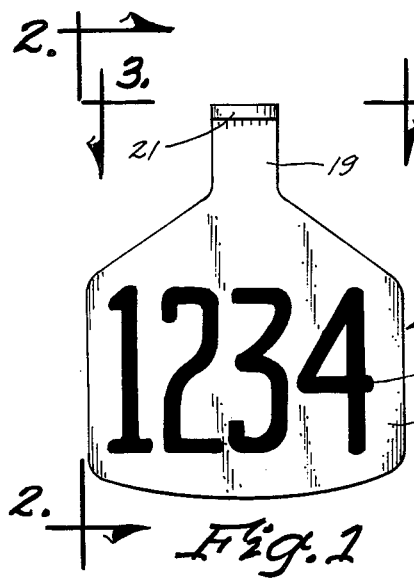
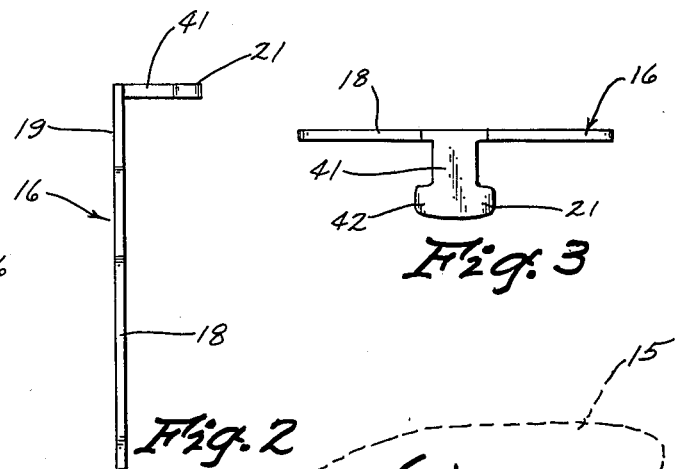
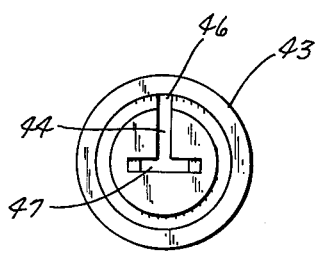
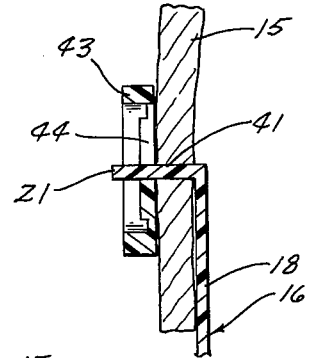
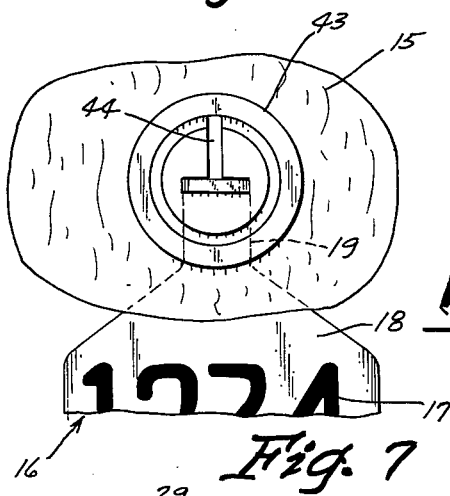
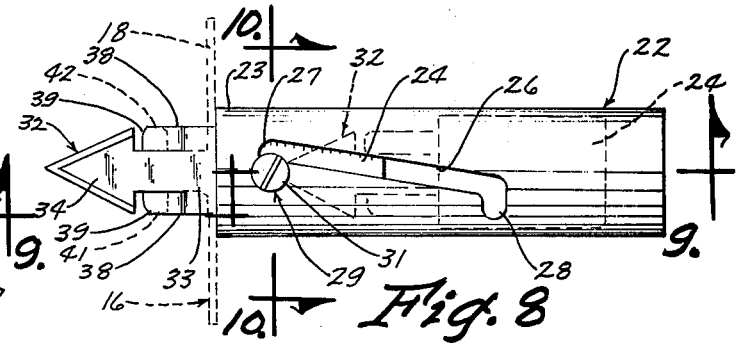
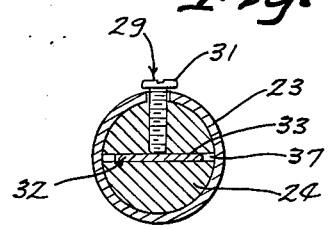
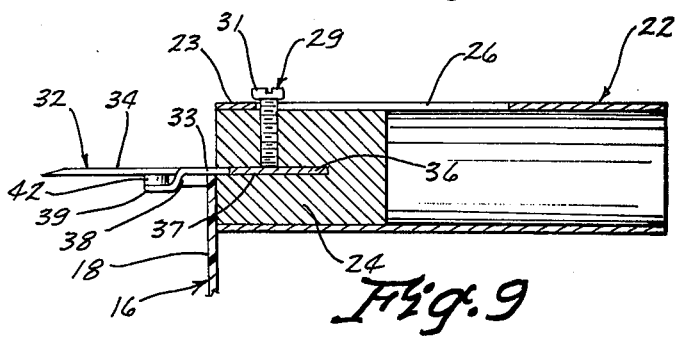

EAR TAG

This application is a continuation-in-part of application Ser. No. 461,093, filed Apr. 15, 1974 now abandoned.

SUMMARY OF THE INVENTION

The invention provides a flexible rubber animal ear tag and applicator for quickly and easily inserting the tag through the ear for securement against accidental removal. By virtue of its flexibility the tag can be moved free of engagement with surrounding obstacles. Because of its rubber construction the tag is weather resistant so as to avoid discomfort to the animal. The applicator is compact and efficient in operation so that the tag is applied to the ear in a minimum of time with little effort by a single operator. The applicator blade is retractible, when not in use, and releasably locked against extension so that the applicator can be safely carried in the wearing apparel of the operator.

BRIEF DESCRIPTION OF THE DRAWINGS

FIG. 1 is a first elevational view of the ear tag;

FIG. 2 is a side view taken as seen on line 2—2 in FIG. 1;

FIG. 3 is a top plan view taken along line 3—3 of FIG. 1;

FIG. 4 is a reduced side elevational view of the ear tag in applied position on the ear of an animal;

FIG. 5 is a side view of a locking member for the ear tag;

FIG. 6 is a sectional view taken on the line 6—6 of FIG. 4;

FIG. 7 shows the locking member of FIG. 5 in assembly relation with the ear tag;

FIG. 8 is a side elevational view of the ear tag applicator showing the blade thereof in extended position;

FIG. 9 is a longitudinal sectional view of the applicator taken on line 9—9 of FIG. 8 showing the ear tag in position thereon to be inserted; and FIG. 10 is a sectional view taken on line 10—10 of FIG. 8.

DETAILED DESCRIPTION OF THE INVENTION

With reference to FIGS. 4 and 6, there is illustrated an animal ear 15 to which is secured an animal identifying plate or tag 16, which is preferably flat and formed of a thin rubber material on which is applied certain animal identifying insignia. Such insignia is indicated at 17 (FIG. 1) and may vary with different owners as is evident. The tag 16 (FIGS. 1 and 2) is comprised of a main body section 18 of a generally rectangular shape having one side thereof gradually extenuated to form a connecting neck section 19 which terminates in a lateral extension 21 of a generally T-shape in plan view.

In order to fixedly attach the tag 16 to the ear of the animal, there is provided an applicator tool 22 which includes an open ended cylindrical housing 23 (FIGS. 8 and 9) and a plunger or piston 24 axially movable therein. The side wall of the housing 23 is formed with a longitudinally inclined slot 26, the ends of which terminate in circumferential extensions or notches 27 and 28. A screw member 29, arranged transversely of the housing 23 is receivable within the slot 26 for threadable engagement with the plunger 24 such that the screw head 31 projects outwardly from the housing 23 to define a finger knob. Thus, on a finger engagement with the screw head 31, the plunger 24 is movable axially of the housing to stop positions defined by the reception of the screw 29 within one or the other of the slot notches 27 or 28.

A knife blade 32 (FIGS. 8, 9 and 10) has an elongated flat body member 33 formed at its front end with an arrow shaped cutting section 34. The rear end section 36 of the knife body member 33 is inserted within a transverse longitudinally extended slot 37 formed in the plunger 24. As best appears in FIGS. 9 and 10, the screw 29 is engageable with one side of the slot-received rear section 36 of the knife blade 32 to rigidly clamp or lock the knife blade for movement with the plunger 24.

Located rearwardly of the knife blade cutting section 34 is a pair of transversely spaced tag supporting finger hooks 38 formed integrally with the knife body member 33. The finger hooks 38 extend longitudinally along opposite sides of the body member 33 and have terminal shelf portions 39 in a common plane parallel to the plane of the body member 33. The free ends of the finger hooks 38 are directed forwardly toward the knife cutting section 34.

As previously mentioned, the neck section 19 has a lateral extension 21 of a T-shape so as to include a stem portion 41 and a cross arm portion 42. In applying the tag 16 to the ear 15 of an animal the knife blade 32 is initially projected outwardly from the housing 23 to its full line operating position shown in FIG. 8. This operating position is defined by reception of the screw 29 in the slot notch 27. The tag 16 is then arranged opposite the finger side of the blade 32, with the stem 41 positioned flat against the cutting section 34. The stem 41 is of a width to be received between the fingers 38, so that on movement of the stem 41 toward the rear end section 36 of the blade 32, each end of the cross arm portion 42 is received within a corresponding or adjacent finger hook 38, as shown in FIGS. 8 and 9.

With tag 16 thus positioned and the plunger 24 locked against movement axially of the housing 23 by the location of the screw 29 in the notch 27, the cutting section 34 of the knife blade 32 is inserted through the animal ear 15 to a position wherein the cross arm portion 42 of the lateral extension 21 and the tag body member 18 are at opposite sides of the ear.

On manipulation of the screw 29 within the slot 26 to retract the knife blade 32 within the housing 23 to its dotted line position shown in FIG. 8, the neck section 19 is engaged by the adjacent end face of the housing whereby the cross arm 42 is removed from or pushed free of the finger hooks 38.

The stem 41 of the lateral extension 21 is thus left in a position extended through the animal ear 15 (FIG. 6). The tag 16 is then securely held in position on the ear 15 by a lock 43 cooperatively associated with the lateral extension 21. The lock 43 (FIG. 5) is of a disc shape formed with a T-shaped slot 44 that has a stem portion 46 of a length greater than the length of the cross arm or locking portion 42 of the lateral extension 21, and a cross arm portion 47 slightly longer than the width of the stem 41 of the extension 21. With both the tag 15 and the lock 43 composed of a rubber material the cross arm 42 is insertable through the stem portion 46 after which the lock 43 is rotated relative to the stem 41 for reception of such stem 41 within the cross arm portion 47 of the lock T-slot 44. The tag 16 is thus securely locked to the ear 15 against removal by the animal in its normal activities.

Although the invention has been described with respect to a preferred embodiment thereof, it is to be understood that it is not to be so limited since changes and modifications can be made therein which are within the full intended scope of this invention as defined by the appended claims.

I claim:

1. The combination of an animal ear tag and an applicator therefor wherein:
   I. The tag comprises:
      a. a flat body member composed of a plastic material including a neck section projected outwardly from one side thereof having a lateral extension normal to the plane of the flat body member with a terminal locking portion thereon, and
   II. The applicator comprises:
      a. a cylindrical tubular housing open at one end,
      b. a plunger axially movable within said housing,
      c. a flat knife member having a front cutting section and a rear section,
      d. means securing said rear section to said plunger for movement of the knife member therewith to retracted and extended positions of said cutting section relative to said one end of the housing, and
      e. means on said knife member adjacent said cutting section for releasably holding said locking portion of the tag in longitudinal alignment with said housing, when the cutting section is in the extended position therefor and with the neck section extended transversely of the housing adjacent said one end thereof for engagement with said one end on movement of the cutting section to the retracted position therefor,
      f. said locking portion, on insertion of said cutting section through an animal's ear to form a slit therein, being moved through said slit to the side of the ear remote from said neck section by said holding means and then released from the holding means on movement of the cutting section to the retracted position therefor.

2. The combination according to claim 1 wherein:
   a. said holding means consists of a pair of transversely spaced hook members arranged at opposite sides of said knife member adjacent said cutting section and open toward said cutting section, said hook members having terminal end sections lying in a common plane parallel to and spaced from the plane of said knife member a distance to releasably engage the locking portion between said knife member and terminal end sections.

3. The combination according to claim 1 including:
   a. coacting means on said cylindrical housing and plunger for defining the extended and retracted positions of said cutting section.

4. The combination according to claim 1 wherein:
   a. said cutting section of the knife member is of an arrow shape and said locking portion has a length transversely of said extension substantially equal to the width of said knife member and less than the width of said extension.

5. The combination according to claim 1 including:
   a. a locking disc mountable on said lateral extension between said locking portion and the side of the animal's ear remote from said neck section,
   b. said locking disc composed of a resilient material and having a slot therein through which said locking portion is insertable.

* * * * *